United States Patent
Ota

[11] 3,841,551
[45] Oct. 15, 1974

[54] THERMO-OPERATION TYPE TRANSFER VALVE

[75] Inventor: Nobuyoshi Ota, Kariya, Japan

[73] Assignee: Nippondenso Co., Ltd., Kariya-shi, Aichi-ken, Japan

[22] Filed: Sept. 15, 1972

[21] Appl. No.: 289,613

[30] Foreign Application Priority Data
Sept. 28, 1971  Japan.............................. 46-88370

[52] U.S. Cl............ 236/86, 236/100 X, 123/117 A, 137/625.11, 137/625.4, 60/527
[51] Int. Cl........................ G05d 23/02, F16k 3/26
[58] Field of Search..... 137/625.11, 625.12, 625.48, 137/625.4, 625.13; 123/117 A; 236/100 X, 86; 60/527

[56] References Cited
UNITED STATES PATENTS

| 3,381,469 | 5/1968 | Schwartz | 60/527 |
|---|---|---|---|
| 3,503,377 | 3/1970 | Beatenbough et al. | 123/117 A |
| 3,521,610 | 7/1970 | Coudriet | 123/117 A |
| 3,540,422 | 11/1970 | Kelly | 123/117 A |

Primary Examiner—Arnold Rosenthal
Attorney, Agent, or Firm—Cushman, Darby & Cushman

[57] ABSTRACT

A transfer valve operative in response to variation in temperature at two predetermined setting points includes a valve member slidable in a valve passage which is provided with an output passage and two input passages. The valve member is divided into two sections coupled to each other with an intermediate rod member. One of the valve sections is provided by a through hole extending axially and one of the input passages is provided with a branch passage opened to a different position from that of the input passage from which it branches off. The valve passage is provided at one end thereof with an thermal expansible wax chamber bounded with a diaphragm. The valve member is slid axially in the valve passage by the force of expansion of the wax in one direction and by a force of a compression spring in the opposite direction.

7 Claims, 8 Drawing Figures

3,841,551

THERMO-OPERATION TYPE TRANSFER VALVE

BACKGROUND OF THE INVENTION

1. Field of the Invention

This invention relates to a thermo-operation type transfer valve which selectively connects one of two input passages to an output passage in response to variation in temperature, and more particularly to a thermo-operation type transfer valve which detects two temperatures and operates to communicate one of the input passages with the output passage at a first temperature between said two temperatures and to communicate the other of the input passages with the output passage at a second temperature other than the first temperature.

2. Description of the Prior Art

Heretofore, it has been known in the art to use an electromagnetically operated cross valve or three-way valve which is operated by an electric signal coming from an electric temperature detector in order to communicate one of two input passages for liquid or gas with an output passage at a temperature within a predetermined range and communicate the other of the input passages with the output passage at a temperature beyond said range. This kind of valve is disadvantageous in that it necessitates an expensive electric temperature detector and an electromagnetic valve, and accordingly it becomes fairly expensive.

Another kind of conventional thermo-operation type transfer valve utilizes thermal expansion of thermo wax. However, this kind of valve is only operable at a single predetermined temperature. Therefore, if this type of valve is desired to be used for switching two input passages selectively to a single output passage at two predetermined temperatures, two valves will be needed for the two different predetermined temperatures with a resultant expensive arrangement.

SUMMARY OF THE INVENTION

The primary object of the present invention is therefore to provide a thermo-operation type transfer valve which is of simple construction made with a small number of parts other than an expensive electromagnetic valve and an electric temperature detector and the like.

Another object of the present invention is to provide an expensive thermo-operation type transfer valve of low cost which operates to selectively communicate two input passage with an output passage in response to a temperature variation with respect to two predetermined temperatures.

The thermo-operation type transfer valve in accordance with the present invention comprises a valve body moved by thermal expansion of a thermal expansible member or material, and a valve passage or cylinder in which the valve body moves and which is provided with an output passage and two input passages arranged in this order, whereby the output passage is communicated with one of said input passages when the temperature is higher than a lower predetermined temperature and lower than a higher predetermined temperature and the output passage is communicated with the other of said input passages when the temperature is lower than the lower predetermined temperature or higher than the higher predetermined temperature. Thus, by use of a single cross valve, a thermo-operation type transfer valve with a single output passage and two input passages can be provided in accordance with the present invention.

DESCRIPTION OF THE PREFERRED EMBODIMENT

Figure 1A:
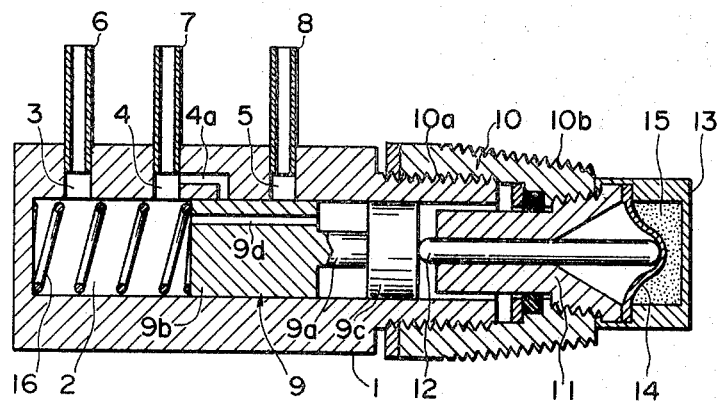
FIGS. 1A, 1B and 1C are longitudinal sectional views showing an embodiment of the thermo-operation type transfer valve in accordance with the present invention in which different positions of the valve body are illustrated.

Referring to FIG. 1, the reference numeral 1 indicates a casing in which a valve body passage 2 having an output passage 3 and two input passages 4 and 5 opened thereto is provided. Into the passages 3, 4 and 5 are inserted and fixed pipes 6, 7 and 8, respectively. Said input passage 4 is provided with a branch passage 4a for making the passage 4 continue to said valve body passage 2 at two positions along the length of the valve body passage 2. The reference numeral 9 indicates a cylindrical valve body consisting of two divided valve sections 9b and 9c connected with each other through an intermediate rod portion 9a. The divided valve section 9b is provided with a through hold 9d extending from one side to the other along the longitudinal direction of the valve body passage 2. Numeral 10 indicates a fitting member screwed to said casing 1 at a screw portion 10a. The fitting member 10 is provided with a screw portion 10b on the outer surface thereof so that the member 10 is fixed to a container retaining a material to be detected of its temperature. The reference numeral 11 indicates a cylindrical member screwed into said fitting member 10 for slidably supporting a movable shaft 12. Numeral 13 denotes a cover defining a thermal expansion chamber together with a diaphragm 14. The cover 13 is exposed to the material to be detected (not shown) and contains therein a thermally expansive element 15. The element 15 includes waxes and powdered copper or the like having good thermal conductivity. A single wax presents a large thermal expansion coefficient when it changes from solid to the liquid state at a predetermined temperature, and accordingly a continuous thermal expansion cannot be performed over a large range of temperatures in the case where only one kind of wax is used.

Figure 3:
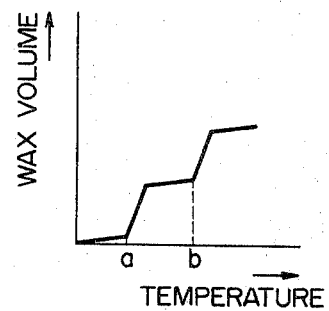
FIG. 3 is a graphical representation illustrating the variation in volume of the thermally expansive element in the transfer valve shown in FIG. 1 with respect to the temperature variation.

Accordingly, two kinds of waxes which have different temperatures at which they change from solid to liquid are used as components of the thermally expansive element. The temperature at which one of the kinds of waxes having a lower melting point is liquefied is the lower setting point $a$ of the element 15 and the temperature at which the other kind of wax having a higher melting point is liquefied is the higher setting point $b$. The volume of the element 15 increases abruptly at the lower setting point $a$ and at the higher setting point $b$ as shown in FIG. 3. The reference numeral 16 indicates a compression spring.

Figure 1B:
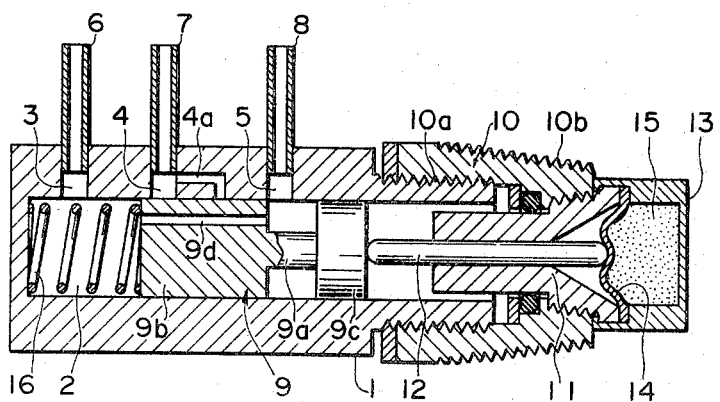
Figure 1C:
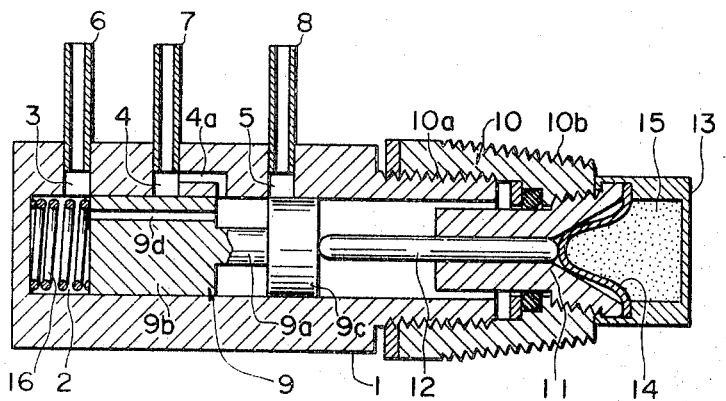

The operation of the valve in accordance with the present invention constructed as described hereinabove will now be described in detail. When the temperature of the material to be detected is lower than the lower setting point $a$, the input passage 5 is closed by the valve body 9 as shown in FIG. 1A and the output passage 3 is communicated with the input passage 4. Then, when the temperature of the material to be detected reaches the lower setting point $a$, the wax of lower melting point in the element 15 is gradually liquefied and thermally expands. Therefore, the movable shaft 12 slides leftward as it is pushed by the diaphragm 14 and moves the valve body 9 leftward against the spring force of the compression spring 16. Thus, as shown in FIG. 1B, the input passage 4 is closed by the valve section 9b of the valve body 9 and at the same time the input passage 5 is faced to the intermediate rod portion 9a of the valve body 9, and the output passage 3 is communicated with the input passage 5 by the through-hole 9d in the valve body 9. Further, when the temperature of the material to be detected increases and reaches the higher setting point ($b$), the wax having the higher melting point 15 is gradually liquefied and expands, and accordingly the movable shaft 12 further moves leftward to move the valve body 9 leftward. Therefore, as shown in FIG. 1C, the input passage 5 is closed by the valve section 9c of the valve body 9 and the branch passage 4a of the input passage 4 is faced to the intermediate rod portion 9a, and accordingly the output passage 3 is communicated with the input passage 4 again by way of the through hole 9d in the valve body 9.

Figure 2:
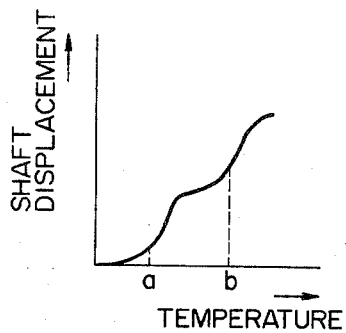
FIG. 2 is a graphical representation illustrating the displacement of a movable shaft of the transfer valve shown in FIG. 1 with respect to the temperature variation.
Figure 4:
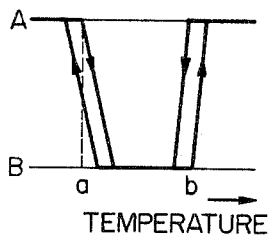
FIG. 4 is a graphical representation illustrating the state of communication between the input passages and the output passage with respect to the temperature variation.

In FIG. 2, the amount of displacement of the movable shaft 12 is illustrated with respect to the temperature variation of the material to be detected. FIG. 4 diagrammatically illustrates the state of communication between the input passage 4 and the output passage 3 in the construction as described above, wherein the line A represents the state where the input passage 4 is communicated with the output passage 3 and the line B represents the state where the input passage 5 is communicated with the output passage 3.

Now the use of the transfer valve in accordance with the present invention will be described. For example, in the case where the temperature of the cooling water of an engine is detected to delay the angular motion of a distributor and reduce the amount of nitrogen oxides in the exhaust gas, it is not necessary to delay the ignition timing when the temperature of the cooling water is lower than about 60°C because at this temperature the amount of discharge of the nitrogen oxides is small and the power of the engine is not desired to be much lowered, and it is also not necessary to uniformly delay the ignition timing even when the water temperature of the cooling water becomes higher than 60°C because the engine is liable to be over heated at the time of over loading. If the temperature of the cooling water of the engine becomes higher than a temperature ranging from about 100°C to 110°C, it becomes necessary to delay the timing of ignition. The transfer valve responsive to two setting temperatures in accordance with the present invention is suitable for an exhaust gas cleaning device which is operated as described just hereinabove.

Figure 5:
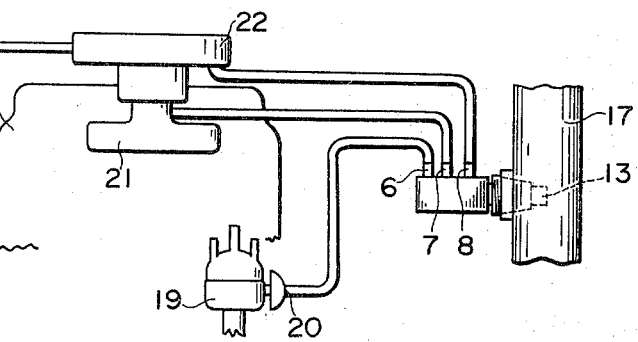
FIG. 5 is a schematic view illustrating the construction of an exhaust gas purifying device in which the transfer valve of the present invention is employed.
Figure 6:
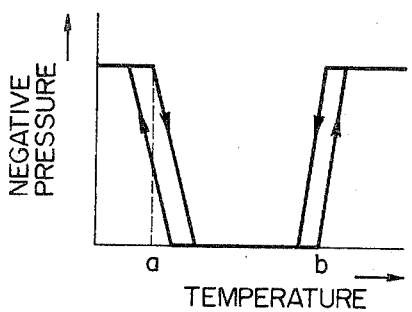
FIG. 6 is a graphical representation showing the vacuum pressure within the output passage of the transfer valve shown in FIG. 5 with respect the temperature variation.

Now referring to FIG. 5 showing an example of an exhaust gas cleaning device employing the transfer valve in accordance with the present invention, the thermosensitive portion such as the cover 13 of the transfer valve of the invention is inserted into and fixed to a cooling water passage 17 such as an upper hose of a radiator, and the output pipe 6 from the valve is connected to an input terminal 20 of a vacuum-operated advancer of a distributor 19. The input pipe 7 is connected to an intake system 21 of an engine 18 and the other input pipe 8 is opened to atmosphere such as the interior of an air cleaner 22. With this construction, when the lower setting point ($a$) of the transfer valve of the invention is set at 60°C and the higher setting point ($b$) is set at a temperature from about 100°C, to about 110°C, the vacuum characteristic of the output passage 3 with respect to the temperature is as shown in FIG. 6. Accordingly, the vacuum-operated advancer of the distributor 19 operates only when the temperature of the cooling water of the engine is lower than the lower setting point or higher than the higher setting point, and the input terminal 20 of the advancer is opened to air so that the vacuum of the engine 18 does not act on the advancer when the temperature of the cooling water is between the lower and higher setting points. Thus, it becomes possible to reduce the nitrogen oxides in the exhaust gas without lowering the power of the engine at the time of cooling thereof and without overheating the engine when the engine is subject to a large load.

What is claimed is:

1. A thermo-operation type transfer valve comprising a casing defining therein a valve passage extending axially of said casing, a cover means closing an end of said casing and adapted to be disposed in heat conductive relationship to a material the temperature of which is to be detected, a single diaphragm disposed axially inwardly of said cover means and extending generally transversely of the axis of said casing for defining with said cover means a single, closed, variable volume chamber, a thermally expansive element which expands as the temperature of the material to be detected rises, said thermally expansive element being contained in said single chamber and including two kinds of waxes having different melting points, a valve member disposed in said valve passage for axial movement by the thermal expansion of said thermally expansive element, said valve passage being provided with a fluid outlet passage and two fluid inlet passages, said outlet passage and said inlet passages each being formed in the peripheral wall of said casing and each being spaced axially from one another, said valve member being provided with a through-hole extending from one end thereof to a portion of the periphery of said valve member between the ends thereof, one of said inlet passages being provided with a branch passage connected thereto which opens into said valve passage at a location axially spaced from the location where the inlet passage having said branch passage is opened to said valve passage, said location being spaced from said outlet passage by at least the length of said through-hole, wherein said outlet passage is communicated with only one of said inlet passages at a temperature lower than a predetermined lower temperature, said outlet passage is communicated with only the other of said inlet passages at a temperature higher than said predetermined lower temperature and lower than a predetermined higher temperature and said outlet passage is communicated with only said one inlet passage at a temperature higher than said predetermined higher temperature.

2. A thermo-operation type transfer valve according to claim 1, in which said cover means includes a generally cup-shaped member, an elongated member axially movably extending between said diaphragm and an end of said valve member, and a compression spring extending between the other end of said valve member and the other end of said casing.

3. A thermo-operation type transfer valve according to claim 1, in which said casing is provided with a fitting member having a threaded outer peripheral surface portion for cooperation with a threaded hole in a container to secure said casing thereto, said container containing the material of which the temperature is to be detected.

4. A thermo-operation type transfer valve according to claim 3, in which said fitting member supports a hollow cylindrical member disposed concentrically therein, said cylindrical member movably supporting an elongated member disposed therein and extending between an end of said valve member and said diaphragm to transmit the thermal expansion of said thermally expansive element to said valve member.

5. A thermo-operation type transfer valve according to claim 1, in which said valve member has end portions and an intermediate portion of a reduced diameter, said end portions being in sliding and sealing engagement with the inner peripheral surface of said valve passage, said through-hole extending through one of said end portions.

6. A thermo-operation type transfer valve according to claim 1, in which said outlet passage is adapted to be connected to the input terminal of a vacuum-operated advancer of an internal combustion engine, said one inlet passage is adapted to be connected to an intake system of said engine, the other said inlet passage is adapted to be opened to atmosphere, and the said thermally expansive element is adapted to detect the temperature of coolant for said engine.

7. A thermo-operation type transfer valve comprising a casing defining therein a valve passage extending axially of said casing, a cover means closing an end of said casing and adapted to be disposed in heat conductive relationship to a material the temperature of which is to be detected, a single diaphragm disposed axially inwardly of said cover means and extending generally transversely of the axis of said casing for defining with said cover means a single, closed, variable volume chamber, a thermally expansive element which expands as the temperature of the material to be detected rises, said thermally expansive element being contained in said single chamber and including two kinds of waxes having different melting points, a valve member disposed in said valve passage for axial movement in accordance with the thermal expansion of said thermally expansive element, said valve passage being provided with a fluid outlet passage and two fluid inlet passages, said outlet passage and said inlet passages each being formed in the peripheral wall of said casing and each being spaced axially from one another, said valve member being provided with a through-hole extending from one end thereof to a portion of the periphery of said valve member between the respective ends of said valve member, one of said inlet passages being provided with a branch passage opened to said valve passage at a location axially spaced from the location where the inlet passage having said branch passage is opened to said valve passage, means for communicating said outlet passage with a first inlet passage at a temperature lower than a predetermined lower temperature, means including said through-hole for communicating said outlet passage with the other of said inlet passages at a temperature higher than said predetermined lower temperature and lower than a predetermined higher temperature, and means including said through-hole and said branch passage for communicating said outlet passage with said first inlet passage at a temperature higher than said determined higher temperature.

* * * * *